United States Patent [19]
Aizawa

[11] 3,908,501
[45] Sept. 30, 1975

[54] SPEED-REDUCING DRIVE MECHANISM FOR BANDSAW MACHINES

[76] Inventor: Tsuneo Aizawa, 1453-4 Ishida, Isehara, Kanagawa, Japan

[22] Filed: Feb. 15, 1974

[21] Appl. No.: 442,783

[52] U.S. Cl. ................................. 83/788
[51] Int. Cl.² .................. B23D 53/06; B23D 55/06
[58] Field of Search ...................... 83/788, 809–813

[56] References Cited
UNITED STATES PATENTS

| | | | |
|---|---|---|---|
| 2,830,628 | 4/1958 | Pettigrew et al. | 83/788 |
| 3,566,731 | 3/1971 | Ensley | 83/811 X |
| 3,799,024 | 3/1974 | Alexander | 83/811 X |

*Primary Examiner*—Willie G. Abercrombie

[57] ABSTRACT

A bandsaw machine includes a support base and a cutting heat movably mounted over the support base. The cutting head includes a driving wheel, a driven wheel, and an endless band blade extending about the driving and driven wheels. A speed reducing drive mechanism is connected between the power input and the driving wheel and comprises a planetary gear system in balanced relationship with the axis of rotation of the driving wheel, and the weight of the planetary gear system is added to the weight of the driving wheel and adds to the fly wheel effect of the driving wheel.

6 Claims, 3 Drawing Figures

SPEED-REDUCING DRIVE MECHANISM FOR BANDSAW MACHINES

BACKGROUND OF THE INVENTION

The present invention relates to bandsaw machines and more particularly to speed-reducing drive mechanisms for use in bandsaw machines for driving a bandsaw blade.

Heretofore, in bandsaw machines having wheels over which a bandsaw blade is trained, reduction gears of the general type have been employed to drive at a reduced speed the wheels and the bandsaw blade. However, such reduction gears of the general type have several distinct disadvantages. One is that they are apt to be bulky and cumbersome in size, since their output shafts have been made massive and long to overcome a large torque and a large radial load and also many shafts and gears have been used to increase the reduction ratio. Accordingly, conventional bandsaw machines provided with such conventional reduction gears as driving means for the bandsaw blade have been liable to be bulky. Also, another disadvantage with the conventional reduction gears is that the output shaft is connected with driven members by means of keys and therefore the mechanisms have been subjected to stress concentration.

On the other hand, horizontal bandsaw machines are generally so constructed that an elongate cutting head or frame having the wheels holding the bandsaw blade is hinged to the machine base by means of a hinge pin and is swung down by its own gravity to cut a material and the cutting stretch of the bandsaw blade is located at one end or the front end of the cutting head which is normal to the hinge pin. Accordingly, it is desirable to locate the center of gravity of the cutting head nearer to the cutting plane of the bandsaw blade, i.e., the front end of the cutting head. However, the conventional reduction gears have been bulky and heavy and for this reason they could not have been mounted nearer to the front end of the cutting head. Accordingly, the center of gravity of the cutting head has been located far away from the cutting plane of the bandsaw blade, and for this reason the cutting head has been subjected to torsion and liable to severe vibration with a result that the cutting accuracy is poor.

Furthermore, with regard to bandsaw machines, it is desirable to make the wheel for driving the bandsaw blade as massive as possible in order to increase the fly wheel effect of the same so that the bandsaw blade may cut through the material without any hitch or interruption. Of course, however, the wheel could not be made massive without any limitation.

SUMMARY OF THE INVENTION

It is an object of the present invention to provide a compact speed-reducing drive mechanism for a bandsaw machine in which a thinner and shorter input shaft is employed and a smaller number of gears and shafts are used.

It is another object of the present invention to provide a speed-reducing drive mechanism for a bandsaw machine in which the input shaft is connected with driven members without any key members in order to avoid the stress concentration.

It is another object of the present invention to provide a speed-reducing drive mechanism which is integrally embodied into a driven member.

It is therefore another object of the present invention to provide a bandsaw machine in which the center of gravity of the cutting head or frame is located nearer to the cutting plane of the bandsaw blade to eliminate the torsion and the vibration of the cutting head.

It is a further object of the present invention to provide a bandsaw machine in which the driving wheel for driving the bandsaw blade is made effectively massive to increase the fly wheel effect.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENT

Figure 1:
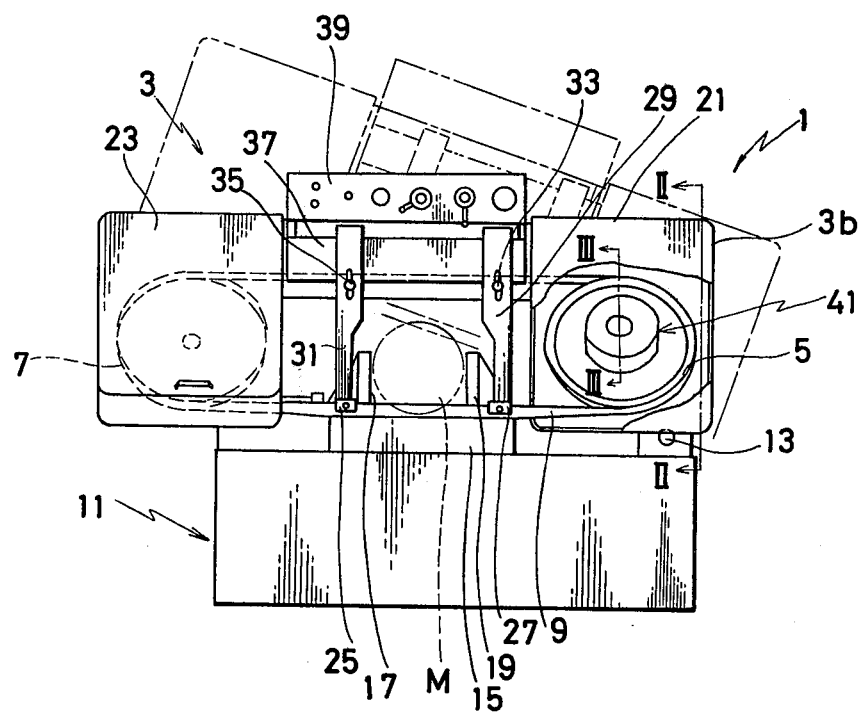
FIG. 1 is a front elevational view of a bandsaw machine, partially broken away to show the speed-reducing drive mechanism of the present invention mounted thereon.
Figure 2:
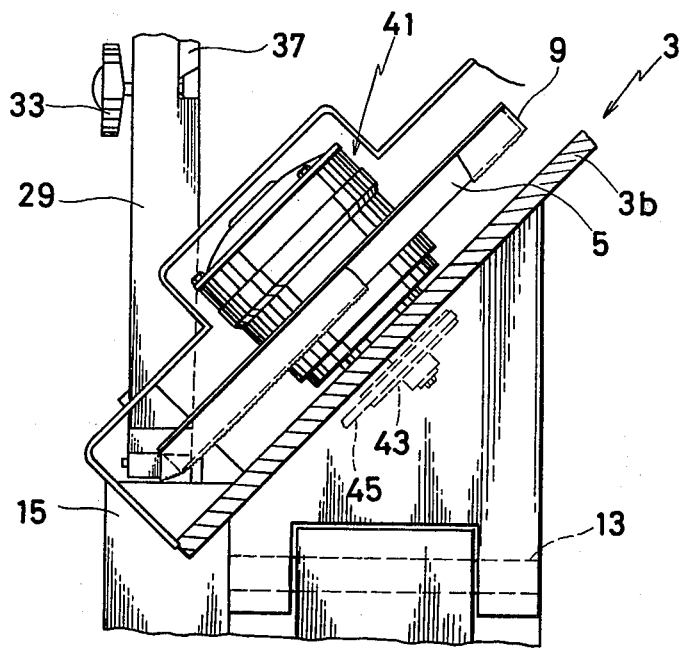
FIG. 2 is a sectional view taken substantially along the line II—II of FIG. 1 and showing the speed-reducing drive mechanism of the present invention.

In FIG. 1, a bandsaw machine generally designated by the numeral 1 is conventional in that an elongate cutting head or frame 3 comprising a yoke-shaped base frame 3b and supporting a driving wheel 5 and a driven wheel 7 both rotatingly holding an endless bandsaw blade 9 is hinged to a portion of a machine base 11 by means of a hinge pin 13 so as to be swung up and down. The cutting head 3 is lifted up hydraulically by a hydraulic cylinder (not shown) up to the raised position as shown by the phantom lines in FIG. 1 and then is swung down by its own gravity around the hinge pin 13 as its pivotal axis to enable the bandsaw blade 9 orbiting thereon to cut a material M which has been placed on a work table 15 mounted on the machine base 11 and is held by vise jaws 17 and 19. Covers 21 and 23 are provided on the cutting head 3 to protect the bandsaw blade 9 and the driving and the driven wheels 5 and 7. As shown in FIG. 2, the cutting head 3 is constructed slant with regard to the hinge pin 13 so that only one of two stretches of the bandsaw blade 9 trained over the driving wheel 5 and the driven wheel 7 may cut down through the material M and the other stretch of the bandsaw blade 9 will not damage the material M and any portions of the machine.

As is also conventional and is shown in FIGS. 1 and 2, the lower stretch of the bandsaw blade 9 is guided and held in a vertical plane by saw guides 25 and 27 held by guide arms 29 and 31 and defining a cutting zone. The guide arms 29 and 31 are adjustably fixed by knobs 33 and 35 to a horizontal guide plate 37 forming a part of the cutting head 3 and located beneath a control console 39. As is thus apparent, the cutting plane of the bandsaw blade 9 is located vertically at the front end of the cutting head 3.

As is shown in FIGS. 1 and 2, it is a feature of the present invention that a compact speed-reducing drive mechanism generally designated by the numeral 41 is integrally combined or unitized with the driving wheel 5 for driving the bandsaw blade 9. The entire drive mechanism 41 unitized with the driving wheel 5 is mounted on the base frame 3b of the cutting head 3 and is given an input power by an input pulley 43 which is located on the backside of the cutting head 3 and is driven through a belt 45 by a motor (not shown) which functions as a power means. Since the driving wheel 5 and the speed-reducing drive mechanism 41 are integrally unitized and mounted on the front top surface of the base frame 3b of the cutting head 3, various advantages can be attained as will be described later. Such construction of the driving wheel 5 and the speed-reducing drive mechanism 41 has been made possible by the compact construction of the speed-reducing drive mechanism 41 belonging to the present invention.

Figure 3:
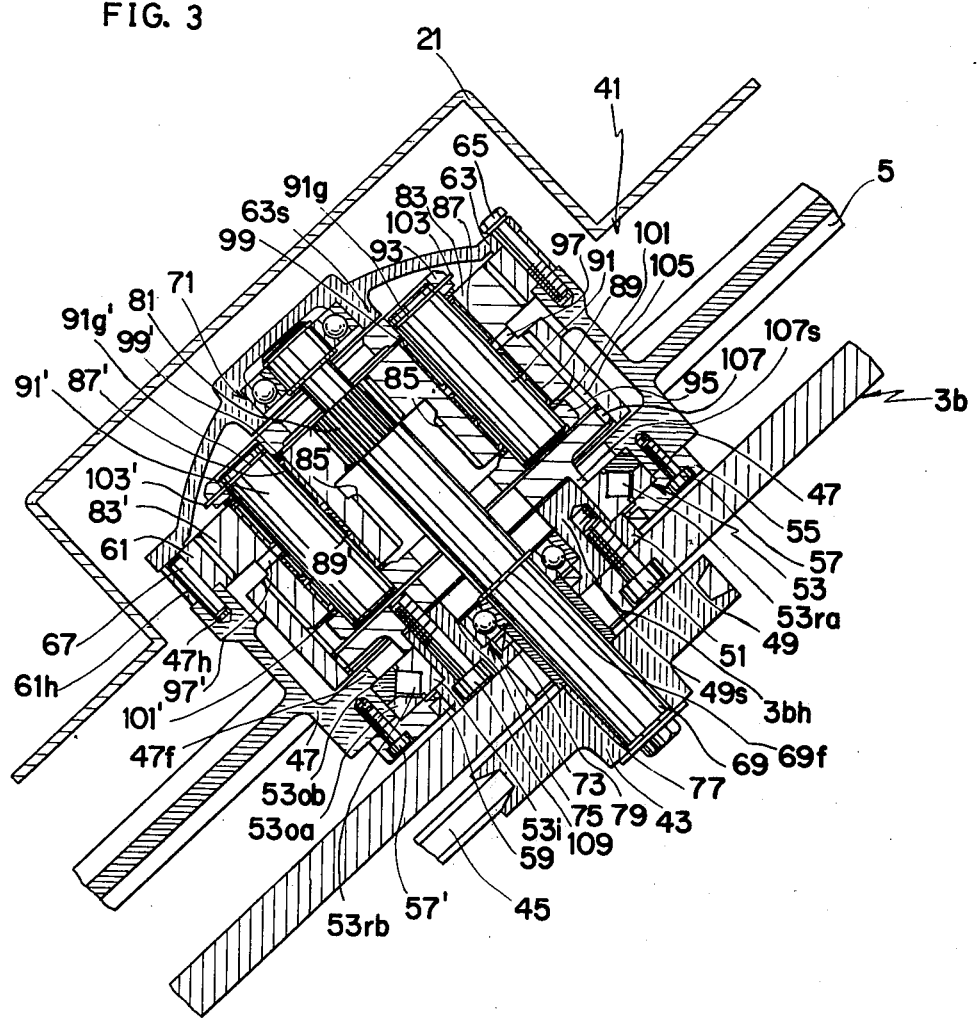
FIG. 3 is a sectional view taken substantially along the line III—III of FIG. 1 and showing the interior construction of the speed-reducing drive mechanism of the present invention.

Referring now to FIG. 3, the speed-reducing drive mechanism 41 comprises a cylindrical housing 47 around which the driving wheel 5 is radially and integrally formed. The entire speed-reducing drive mechanism 41 is supported on the base frame 3b of the cutting head 3 in a manner such that a ring-like support member 49 incorporated into the mechanism and having a sleeve-like projection 49s is fixedly secured to the base frame 3b of the cutting head 3 by a plurality of tightening means or bolts 51.

The cylindrical housing 47 is so designed as to be rotated on an annular bearing means 53 which is mounted around the sleeve-like projection 49s of the ring-like support member 49. The annular bearing means 53 shown in FIG. 3 is a so-called cross roller bearing which is of a type capable of bearing both of thrust and radial loads and has been designed in a manner such that a plurality of cylindrical rollers tilted 45° in one direction as designated by 53ra and a plurality of like rollers tilted 45° in opposite direction as shown by 53rb are disposed alternately between an inner race 53i and bisected outer races 53oa and 53ob. The outer races 53oa and 53ob of the annular bearing means 53 are kept pressed toward each other between an inner flange 47f formed on the interior of the cylindrical housing 47 and a ring member 55 which is pressedly secured to the descending end portion of the cylindrical housing 47 by a plurality of tightening means or bolts 57. Accordingly, the outer races 53oa and 53ob of the bearing means 53 are kept pressing the rollers 53ra and 53rb downwardly so that the bearing means 53 may be free from any backlashes during the rotation of the cylindrical housing 47 thereon. Of course, the cross roller bearing shown in FIG. 3 could be replaced by any other suitable means such as an angular-contact bearing. A suitable annular packing means 59 is provided between the ring-like support member 49 and the ring member 55 in a manner surrounding the former.

An internal rotatable ring gear member 61 is fixedly mounted on the ascending end of the cylindrical housing 47. Also, a bowl-like cover 63 is fixedly secured to the outer or ascending end of the internal gear member 61 to cover the interior of the speed-reducing drive mechanism 41. In order to fixedly secure the cover 63 and the internal gear member 61 to the cylindrical housing 47, a plurality of tightening means or bolts 65 are provided on their peripheries. Also, a plurality of dowels or pins 67 are put in holes 61h and 47h formed at the peripheries of and concentrically with respect to the internal gear member 61 and the ascending end of the cylindrical housing 47, respectively, so as to completely prevent relative movement of the internal gear member 61 and the cylindrical housing 47.

An input shaft 69 is rotatably provided at the center of and extends along the rotational axis of the cylindrical housing 47 and the speed-reducing drive mechanism 41 and through the ring-like support member 49. The descending end of the input shaft 69 is projected through a hole 3bh formed through the base frame 3b of the cutting head 3 out to the backside of the cutting head 3 and is connected with the input pulley 43 fixedly secured thereto and driven by the belt 45 connected with the motor. The ascending end of the input shaft 69 is extended to the inside of the cover 63 and is rotatably supported therein by a radial bearing member 71 which is mounted in a sleeve-like projection 63s formed at the inside center of the cover 63. The input shaft 69 is also supported rotatably by another radial bearing member 73 which is mounted in the sleeve-like projection 49s of the ring-like support member 49 and is held to the position by a snap ring 75. A tubular spacer or bushing 77 surrounding the input shaft 69 is provided between the radial bearing member 73 and the input pulley 43. In order to prevent axial movement of the input shaft 69, a flange 69f abutting the radial bearing member 73 is provided on and around the input shaft 69. Also, a suitable annular packing means 79 is provided between the ring-like support member 49 and the spacer 77.

The input shaft 69 is provided or formed at its portion near its ascending end with a gear 81 acting as a sun gear. A plurality of primary planetary gear members 83, 83' are disposed between the sun gear 81 and the internal gear member 61 so as to engage both of them simultaneously.

Each of the planetary gear members 83, 83' is provided at its inner or descending end with a secondary planetary gear member 85, 85' which is integral and coaxial therewith and is smaller in diameter than the primary planetary gears 83, 83'. The larger diameter planetary gear members 83, 83' and the smaller diameter planetary gear members 85, 85' are rotatably supported through needle roller bearing members 87, 87' and 89, 89' by shafts 91, 91' which are mounted at proper intervals between two ring-like support members 93 and 95. In order to prevent axial movement of the needle roller bearing means 87, 87' and 89, 89', pins 97, 97' are put in holes formed radially between the larger planetary gear members 83, 83' and the smaller planetary gear members 85, 85'. Spacers 99, 99' and 101, 101' surrounding the shafts 91, 91' are provided, respectively, between the outward or ascending ends of the planetary gear members 83, 83' and the ring-like support member 93 and between the inward or descending ends of the smaller planetary gear members 85, 85' and the ring-like support member 95. Also, in order to prevent axial movement of the shafts 91, 91', pins 103, 103' radially extending through the ring-like support member 93 are so provided as to be put in annular grooves 91g, 91g' formed at the ascending ends of the shafts 91, 91'.

The smaller secondary planetary gears 85, 85' are so designed as to engage a stationary internal ring gear member 105 which is so located within the cylindrical housing 47 as to be coaxial with the same. The stationary internal ring gear member 105 is kept stationary by a circular holding member or gear member 107 engaging the inward or descending end of the former. The circular holding gear member 107 is fixedly supported by the ring-like support member 47 through a plurality of tightening means or bolts 109. The sleeve-like projection 107s formed on the circular holding member or gear member 107 is designed to hold the inner race 53i of the annular bearing means 53 in cooperation with the ring-like support member 49.

The operation of the speed-reducing drive mechanism of the present invention will be described. When the input pulley 43 is rotated through the belt 45 by the motor, the input shaft 69 is rotated with the sun gear 81. Accordingly, the primary planetary gear members 83, 83' engaging the sun gear 81 are rotated on the shafts 91, 91' in unison with the secondary planetary gear members 85, 85'. However, since the stationary internal gear member 105 engaging the secondary planetary gear members 85, 85' is always kept stationary, the secondary planetary gear members 85, 85' are rolled on and within the stationary ring gear member 105, engaging therewith. Accordingly, the larger diameter primary planetary gear members 83, 83' unitized or connected integrally with the secondary planetary gear members 85, 85' will revolve round the sun gear 81 and simultaneously drive the internal rotatable ring gear member 61 at an angular velocity slower than the angular velocity of power input shaft 69. It will be understandable to those skilled in the art that the internal gear member 61 is driven at a reduced speed by the sun gear 81 and the planetary gear members 83, 83'. When the internal gear member 61 is driven at a reduced speed, the cylindrical housing 47 is rotated therewith and accordingly the driving wheel 5 formed around the cylindrical housing 47 will drive the bandsaw blade 9 at a reduced speed.

As has been so far described, the speed-reducing drive mechanism according to the present invention is of a very compact construction and therefore it has various advantages. It can be advantageously integrally embodied into the driving wheel 5 for driving the bandsaw blade 9. Since the speed-reducing drive mechanism 41 is connected with the driving wheel 5 without any key member in a manner such that the driving wheel 5 is formed at the periphery of the cylindrical housing 47, the conventional disadvantages such as the stress concentration can be minimized. Since the speed-reducing drive mechanism 41 is integrally embodied into the driving wheel 5, the center of gravity of the cutting head 3 is located near to the cutting plane of the bandsaw blade 9, i.e., the front end of the cutting head 3 that is the left-hand end of the cutting head as viewed in FIG. 2. The driving wheel 5 of the bandsaw machine can be made massive without making the entire size of the bandsaw machine bulky so as to increase the fly wheel effect so that the bandsaw blade 9 can make cuts without any hitch or interruption. Also, since the annular bearing means 53 is effectively employed, the speed-reducing drive mechanism 41 is free from any backlashes.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A bandsaw machine comprising a support base, a cutting head movably mounted over said support base and including a driving wheel, a driven wheel, and an endless bandsaw blade extending about said driving wheel and said driven wheel, power means for rotating said driving wheel, a speed reducing drive mechanism driven by said power means and mounted on said cutting head and including a power input shaft extending along the axis of rotation of said driving wheel, and said speed reducing drive mechanism including speed reducing means interconnected between said power input shaft and said driving wheel and disposed substantially in concentric relation to said driving wheel for reducing the rotational velocity from said power input shaft to said driving wheel.

2. The bandsaw machine of claim 1 wherein said speed reducing means comprises a sun gear connected for rotation in unison with said power input shaft, a rotatable ring gear member and a stationary ring gear member, primary planetary gear members positioned to be driven by said sun gear, secondary planetary gear members of a diameter smaller than said primary planetary gear members and connected for rotation in unison with said primary planetary gear members, said secondary planetary gear members being positioned in engagement with and revolvable about said stationary ring gear member, said primary planetary gear members being positioned in engagement with and revolvable about said rotatable ring gear member, and said rotatable ring gear being connected for rotation in unison with said driving wheel.

3. A bandsaw machine comprising a blade driving wheel, a power means, a speed-reducing drive mechanism connected between said power means and said driving wheel and including a cylindrical housing rotatable about its longitudinal axis and including a first internal gear member provided coaxially at one end thereof, an input shaft rotatably provided at the axis of rotation of said cylindrical housing and including at one of its ends a sun gear, a support member surroundingly supporting said input shaft and supporting said cylindrical housing to enable the cylindrical housing to rotate thereon, a cover fixedly secured to the outward end of said internal gear member and supporting rotatably the end of said input shaft, a plurality of planetary gear members mounted between and in engagement with both said sun gear and said internal gear member, a plurality of gear members provided at the inward ends of the planetary gear members coaxially and integrally therewith and each having a smaller diameter than the planetary gear members, and a second stationary internal gear member engaging the gear members.

4. The speed-reducing drive mechanism of claim 3 in which the cylindrical housing is supported by the support member through a roller bearing means for eliminating backlashes.

5. The speed-reducing drive mechanism of claim 3 wherein the cylindrical housing is provided at its periphery with a driving wheel.

6. The speed-reducing drive mechanism of claim 3 which is mounted on a cutting head of the bandsaw machine.

* * * * *